United States Patent [19]

Romagnoli

[11] Patent Number: 4,929,299

[45] Date of Patent: May 29, 1990

[54] SEALING DEVICE WITH MULTIPLE DIFFERENTIAL ACTION FOR MACHINES PRODUCING DUAL-USE FILTER SACHETS FOR INFUSION PRODUCTS

[75] Inventor: Andrea Romagnoli, San Lazzaro di Savena, Italy

[73] Assignee: Cestind - Centro Studi Industriali-S.R.L., San Pietro Terme, Italy

[21] Appl. No.: 366,303

[22] Filed: Jun. 13, 1989

Related U.S. Application Data

[63] Continuation of Ser. No. 154,784, Feb. 10, 1988, abandoned.

[30] Foreign Application Priority Data

Mar. 9, 1987 [JP] Japan .................................... 62-3378

[51] Int. Cl.⁵ ............................................. B65B 51/20
[52] U.S. Cl. .................................. 156/466; 156/497; 53/373
[58] Field of Search ...................... 156/466, 203, 497; 53/373, 375

[56] References Cited

U.S. PATENT DOCUMENTS

| | | | |
|---|---|---|---|
| 3,381,448 | 5/1968 | Ayres et al. | 53/373 |
| 3,488,244 | 1/1970 | Lepisto | 53/373 X |
| 3,535,987 | 10/1970 | Schafer et al. | 53/375 X |
| 3,606,727 | 9/1971 | Davis | 53/373 X |
| 3,720,565 | 3/1973 | Cavanna | 53/373 X |
| 4,249,364 | 2/1981 | Kawasaki et al. | 53/373 X |
| 4,696,147 | 9/1987 | Noh | 156/466 X |

*Primary Examiner*—David Simmons
*Attorney, Agent, or Firm*—Herbert Dubno

[57] ABSTRACT

A sealing device with multiple differential action is provided for machines producing dual-use filter sachets for infusion products. In such machines a continuously moving strip of thermally weldable filter paper, fed with equidistantly spaced fractional doses of the infusion product, is progressively folded longitudinally into a flattened tubular shape with adjacent folded-back longitudinal edges forming a longitudinal crest. The device is constituted by two blocks having respective pairs of mirror-image stepped overlapping edges extending to the opposite sides of the adjacent folded back edges of the strip forming the longitudinal crest. The mirror-image edges of the upper overlap have bores connected to a fluid-dynamic heat source. The mirror-image edges of the lower step have a lamellar structure.

4 Claims, 3 Drawing Sheets

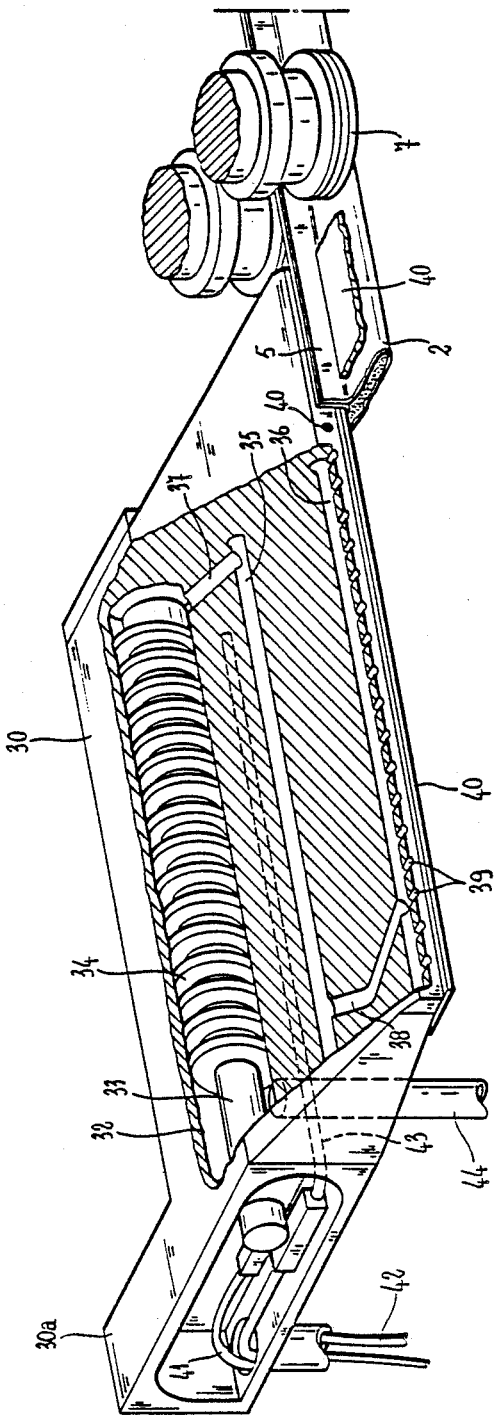

SEALING DEVICE WITH MULTIPLE DIFFERENTIAL ACTION FOR MACHINES PRODUCING DUAL-USE FILTER SACHETS FOR INFUSION PRODUCTS

This is a continuation of co-pending application Ser. No. 07/154,784 filed on February 10 1988 now abandoned,

FIELD OF THE INVENTION

The present invention relates to a sealing device with multiple differential action for machines producing dual-use filter sachets for infusion products.

BACKGROUND OF THE INVENTION

Italian Patent Application No. 3376 A/87 and corresponding U.S. application Ser. No. 07/154,782 filed concurrently herewith, an automatic machine is known for the continuous production of dual-use filter sachets for infusion products with succesive bags or pouches containing fractional doses of said products.

This machine has along the production line, a succession of means including means for progressively fold back and seal longitudinally a strip of thermally weldable filter paper in a flattened tubular form oriented horizontally and to thermally weld the tube transversely so as to enclose the individual fractional doses between two successive transverse thermal welds.

Rotary wheel means has pickup elements for applying to said flattened tube equidistantly spaced labels, a longitudinally continuous thread transversely contacting said labels as well as thermally weldable stickers or tabs through alternate transverse thermal welds partly to the backs of the.

As means is provided for cutting up the tube thus mode into portions comprising of at least two bags and for setting up these bags against each other and sealing together their extremities.

A dual-use filter sachet with multiple bags or pouches in succession or in series, each containing a corresponding fractional dose or unit quantity of the infusion product allows for the two modes of use, one in the flattened form to be collated in lots for the sale of said bags or pouches in superimposed or back-to-back arrangement by folding one bag or pouch over or adjacent to the other, and one mode in an unfolded or extended arrangement of said bags or pouches. The thread has a length which is substantially equal to the length of the sachet in its unfolded use arrangement of the bags or pouches, and is fixed to the opposing extremity of said sachet by means of a sticker or tab made of a thermally weldable material together with the label made of a nonweldable paper in the proximity of said opposing extremity so that the thread can longitudinally surround the outside of the sachet when these bags or pouches are in their back-to-back collated arrangement in lots for sale.

OBJECT OF THE INVENTION

The principal object of the present invention is that of providing a sealing device with multiple differential action for the longitudinal sealing of the strip of thermally weldable filter paper as it is being formed into the flattened tubular shape, said device being adapted to effect longitudinal sealing of the continuously moving strip of filter paper.

Another object of the present invention is such a sealing device with multiple differential action as as to have a thermofluidic action and a mechanical action for joining the longitudinal edges of the strip of thermally weldable filter paper folded in a tubular shape and entrained in continuous movement.

Yet another object of the present invention is to provide a device of the type described having combined thermofluidic and mechanical action and which is of particularly simple and economic construction, considering the outputs attainable therewith.

SUMMARY OF THE INVENTION

These and other objects are all achieved with the sealing device with multiple differential action according to the invention, particularly adapted to be used in machines producing dual-use filter sachets for infusion products such as tea, camomile and the like. The machines are of the type which comprise means effecting the progressive longitudinal folding of a strip of thermally weldable filter paper entrained in continuous movement in a horizontally oriented flattened tubular form and supplied with equidistantly spaced fractional doses of the infusion products, the longitudinal edges of said strip of thernally weldable filter paper being folded back adjacently in a vertical arrangement to create a longitudinal crest.

According to the invention, the sealing device is essentially constituted by two blocks conformed so as to have respective pairs of mirror-image-like stepped overlapping edges extending mirror-fashion (i.e. in mirror symmetrical relationship) parallel to the sides opposite thereto of the longitudinal edges folded into a longitudinal crest of the aforesaid strip of thermally weldable filter paper. The mirroring edges of the upper overlap have a plurality of bores turned towards the outer surface of the longitudinal crest and are linked to a fluid-dynamic heat source while the mirror-image edges of the lower step have a lamellar structure.

BRIEF DESCRIPTION OF THE DRAWING

Further features and advantages of the sealing device according to the present invention will be more apparent from the following detailed description of and embodiment of it, described here solely by way of example with reference to the accompanying drawing, in which:

FIG. 3 shows, in a perspective view and on a still larger scale, a part of the said sealing device according to the invention, with some of its regions cut away and others in section for the sake of better understanding.

SPECIFIC DESCRIPTION

Figure 1:
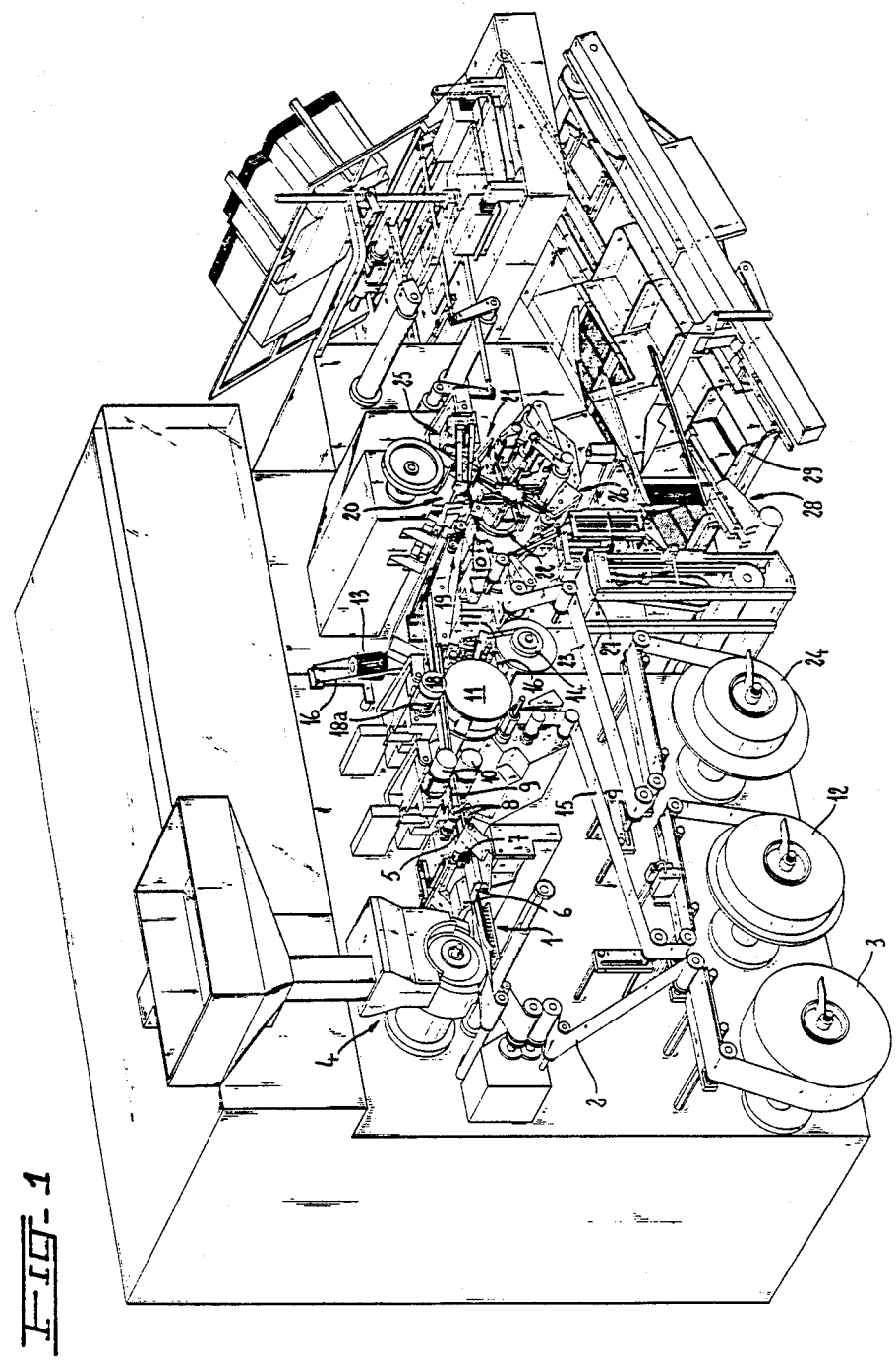
FIG. 1 shows the conditioning machine equipped with the sealing device according to the invention, in a perspective view of front-side elevation.

The conditioning machine shown in FIG. 1 is that which is claimed and described in the above-cited Italian Patent Application No. 3376 A/87 and copending U.S. application Ser. No. 07/154,782 filed February 10 1988, employing the sealing device according to the present invention and showing the integrated production line.

This production line is intended for the continuous formation of dual-use filter sachets with successive or serially arranged bags or pouches, each containing a fractional dose of the infusion product, folded back one over the other and fitted with labels and thread for their handling by the user with said pouches being in a spaced arrangement relative to each other, for the packaging of the individual filter sachets in respective external envelopes and for the collating of the said filter sachets thus enveloped into lots for packing into cartons or boxes for storage and sale.

The integrated production line of the machine is essentially defined by a succession of means which provide for the continuous production of the dual-use filter sachets. In particular, the machine (FIG. 1) comprises means 1 for supporting and folding in a substantially flattened tubular form a strip of thermally weldable filter paper 2 drawn from a reel 3 in continuous motion in substantially horizontal orientation; feeder-dosing means 4 for discharging equidistantly spaced fractional doses of the infusion product onto and along the strip 2 of thermally weldable filter paper is continuous movement while the strip is formed by said support and folding means 1 into the substantially flattened tubular form, with the longitudinal edges of the strip 2 in vertical arrangement of mutual contact forming a longitudinal crest 5; and multiple action welding means 6 capable of thermally welding the edges in vertical mutual contact forming the crest 5.

The machine also comprises means with knurling rollers 7 operating on the longitudinal crest 5 capable of sealing same by knurling; means with, respectively, rollers and counter-rollers 8 transversely spaced and capable of operating laterally relative to the sealed and knurled longitudinal crest 5 on the continuously moving strip of filter paper in the substantially flattened tubular form for the entrainment of the strip, maintaining and enhancing the flattening thereof; and leaf-spring folding means 9 capable of folding back laterally the said longitudinal crest 5 welded and knurled on the strip of filter paper in said flattened tubular form.

The machine, further downstream, comprising means with welding rollers and counter-rollers 10 for effecting the transverse thermal welding of the continuously moving strip of filter paper in the flattened tubular form between the fractional doses of infusion materials so as to enclose the fractional doses with each transverse thermal weld; and means with a wheel or rotary head 11 fitted with pickup elements for feeding from a respective infeed reel 12 beneath and in contact with the said continuously moving strip of filter paper in its flattened tubular form, a succession of labels cut from the strip 15 of reel 12, each of which is spaced relative to the median transverse line of the alternating transverse thermal welds.

A continuous longitudinal thread 16 is fed from a corresponding reel 13 to transversely contact the lower or outer surface of the succession of labels. A succession of stickers or tabs can be cut from the strip 17 from a reel 14 of thermally weldable material, and applied across these alternate transverse thermal welds, partly to the backs of the labels.

Roller means 18 with thermal pressure pads, equidistantly spaced peripherically for operating in counter-rotating combination with said means with the wheels or the rotary head 11, has pressure elements 18a; with thermal tampons pressing these thermally weldable stickers or tabs to the thread and the latter to the labels as well as the thread to the strip of continuously moving filter paper in the flsttened tubular form across the said alternating transverse thermal welds.

A sectioning means 19 is provided for cutting up the strip of filter paper in the flattened tubular form and in continuous movement thus fitted with labels, longitudinal thread and stickers or tabs of thermally weldable material in registration with the aforesaid median transverse line of the alternating transverse thermal welds into portions or sections comprising at least two successive bags or pouches.

In addition, the machine comprises along the processing path, folding and transfer means 20 for re-folding and transfer ring the portions or sections of strip of filter paper in flattened tubular form with at least two bags and pouches relative to the median line in the corresponding interving corresponding transverse thermal weld so as to superimpose or serially stack the bags or pouches; thermal welding means 21 capable of joining by thermal welding the respective resulting adjoining terminal transverse edges with the aid of the corresponding stickers or tabs of thermally weldable material; means including rotating wheels 22 with radial pincers; means for infeeding and for folding into V-shape portions of the paper cut from the strip 23 on reel 24; means 25 for transferring said filter sachets located between the prongs of the V-shaped paper fold; transfer means for the V-shaped paper portions with insertion of the corresponding filter sachet between the radial pincers of the rotary wheel 22; means 26 for sealing the edges of the said portions folded in V-shape to constitute the containing envelope of the filter sachet; means 27 for stacking these packs; and means 28 for transferring said collated packs into cartons or boxes 29 prefabricated for this purpose.

The welding means 6 referred to above and provided in the production machine according to the above-cited Italian Patent Application No. 3376 A/87 corresponding to the above-identified U.S. patent application, are provided in the device of the present invention and consist, essentially, of two blocks facing each other and so fashioned that each presents a corresponding pair of overlapping stepped edges extending mirror-image fashion parallel to the opposite sides of the longitudinally folded adjacent edges in the form of longitudinal crest 5 of the strip of thermally weldable filter paper 2 in its flattened tubular form and in which the mirror-image edges of the upper overlap have a plurality of bores respectively turned towards the corresponding external surface of the longitudinal crest 5 and communicate with a fluid-dynamic heat source while the similar edges of the lower overlap have a laminar structure.

Figure 2:
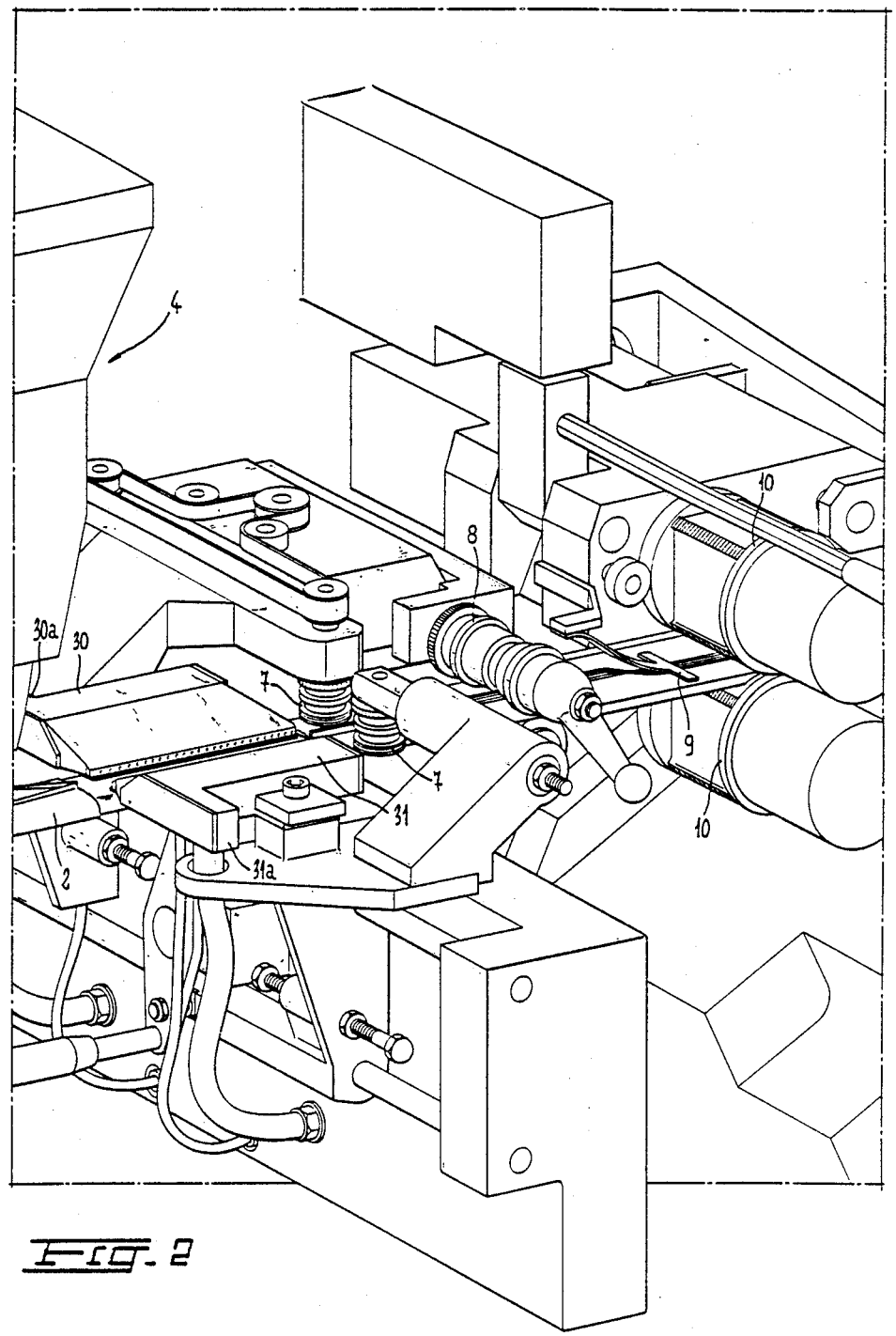
FIG. 2 shows, also in a perspective view of frontside elevation and on an enlarged scale, that part of the conditioning machine which involves the sealing device according to the invention.

These two blocks facing each other, respectively represented at 30 and 31 in FIG. 2, have a trapezoidal transverse section with the mutually opposing respective sides being tapered towards the lower side and with a respective box-shaped extension 30a, 31a on the corresponding opposite sides thereof. Each of these oppositely facing blocks 30 and 31 is fitted, parallel to the tapered side, with a chamber-like opening 32 communicating with the recess of the respective box-shaped extension containing a corresponding electrical resistance 33 with cylindrical core and a spiral or helical peripheral winding 34.

Through horizontal conduits 34, 36 and transverse conduits 37, 38 formed in the tapered portion of each block 30, 31 the extremity of chamber 32, located opposite the respective box-shaped extension 30a, 31a, communicates with a plurality of bores 39 formed in the truncated face of the frustopyramidal portion of the block 30, 31 arranged in mirror-image fashion. Under said bores 39, there is fastened to the tapered interfacing blocks 30, 31, a corresponding thin plate 40 projecting outwards relative to said truncated face into which open the said bores 39 thus forming a terminal structure of the conically shaped part with respectively interfacing levels.

In the interior of the box-shaped extensions 30a, 31a of each block 30, 31 the respective cored electrical resistance 33 is connected to an electrical conductor 41 running along a conductor 42 of a thrmocouple 43 extending parallel to the electrical resistance heater 33 between the latter and the conduit 35. Through a conduit 44, the chamber 32 communicates with a compressed air source.

With a structure thus conformed of the sealing device according to the present invention, it has been found in practice that the longitudinal crest 5 to be sealed of the strip of thermally weldable filter paper 2 passing in continuous movement between the interfacing stepped structures, heated by hot air issuing from the bores 39 and guided between the plates 40 by means of knurling rollers 7 receives a faultless weld in accordance with the objects specified.

It is obvious that the description of the sealing device in question with reference to the Figures of the attached drawings is given solely by way of example and it is further obvious that all modifications and variants thereof suggested by practice and by their operation and use or employment will fall within the scope of the following Claims.

I claim:

1. A sealing device for sealing a longitudinal crest of a strip of thermally weldable paper having longitudinal edges turned inwardly and vertically into contact with one another to form said strip into a tube, preferably for receiving portions of an infusion product in the production of infusion-beverage bags, said sealing device comprising:
    means for advancing said tube along a path, said tube being formed with a flattened tubular bottom portion bridging two horizontal sides of said strip, each of said horizontal sides running into a respective vertical side of the strip, said vertical sides of the strip being formed with said longitudinal edges of said strip turned inwardly and vertically;
    horizontal supporting means below said path for quiding said bottom portion of said tube; and
    a pair of blocks extending along said path for welding said longitudinal edges forming said crest together, said blocks having:
    mutually juxtaposed mirror-symmetrical stepped edges flanking said crest and extending along said path, each of said stepped edges having a laminar step extending closest to the other stepped edge and slidingly guiding respective sides of said crest, each of said laminar steps being formed with a horizontal bottom of the laminar step above said horizontal supporting means and a vertical side of said laminar step flanking the respective vertical side of said strip, said horizontal bottom of said laminar step being engaged with the respective horizontal side of said strip forming said crest having the respective longitudinal edge of said strip above said laminar step, and a setback step confronting the respective vertical side of said strip and formed with a plurality of bores opening toward the respective vertical side of said strip;
    a heat source in each block, and
    passage means in each block communicating with said heat source, connected to a source of fluid, and connected with said bores for training streams of said fluid after heating by said source upon said vertical sides of said strip to weld said longitudinal edges at said crest, said blocks being of trapezoidal configuration and having sides tapering toward said crest and the other block and formed with said stepped edges, said blocks each being formed with an elongated chamber parallel to the respective edge, each heat source being a resistance heater received in the respective chamber, said passage means including means connecting an air source to one end of said chamber and a passage connecting an opposite end of each chamber with the respective bores of the respective body, said resistance heater having a generally helical winding, said bores of each body opening into a respective conduit extending along the respective stepped edge and the respective passage connects said opposite end of the chamber with the horizontal conduit of the respective body.

2. The sealing device defined in claim 1 wherein said means for advancing said tube along said path includes a pair of knurled rollers flanking said crest and engaging same.

3. The sealing device defined in claim 4 wherein said stepped edges and said path are horizontal.

4. The sealing device defined in claim 3, further comprising a respective thermocouple received in each of said bodies.

* * * * *

UNITED STATES PATENT AND TRADEMARK OFFICE
CERTIFICATE OF CORRECTION

PATENT NO. : 4,929,299

DATED : 29 May 1990

INVENTOR(S) : Andrea ROMAGNOLI

It is certified that error appears in the above-identified patent and that said Letters Patent is hereby corrected as shown below:

Title Page:

Item [30] - Foreign Application Priority Data -
should read:

-- Mar. 9, 1987 [IT]   Italy   3378 A/87 -- .

Signed and Sealed this

Seventh Day of January, 1992

*Attest:*

HARRY F. MANBECK, JR.

*Attesting Officer*  *Commissioner of Patents and Trademarks*